United States Patent
Meruva et al.

(10) Patent No.: US 10,069,645 B2
(45) Date of Patent: Sep. 4, 2018

(54) FLEXIBLE LINK SYSTEM FOR DYNAMIC SWITCHING AMONG DIFFERENT WALL MODULE TYPES WITH A CONTROLLER

(71) Applicant: Honeywell International Inc., Morris Plains, NJ (US)

(72) Inventors: Jayaprakash Meruva, Bangalore (IN); Wolfgang Schmieder, Baden-Wurtemberg (DE); Vinay Prasad, Bangalore (IN); Yongxi Zhou, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 322 days.

(21) Appl. No.: 14/997,369

(22) Filed: Jan. 15, 2016

(65) Prior Publication Data
US 2017/0205782 A1    Jul. 20, 2017

(51) Int. Cl.
*H04L 12/28*    (2006.01)
(52) U.S. Cl.
CPC ...... *H04L 12/2816* (2013.01); *H04L 12/2814* (2013.01)
(58) Field of Classification Search
None
See application file for complete search history.

(56) References Cited

U.S. PATENT DOCUMENTS

| 7,924,151 | B2 | 4/2011 | Brissman et al. |
|---|---|---|---|
| 8,055,743 | B2 | 11/2011 | Frutiger et al. |
| 8,532,797 | B2 | 9/2013 | Gutha et al. |
| 8,782,297 | B2 | 7/2014 | Voss et al. |
| 2012/0038458 | A1 | 2/2012 | Toepke et al. |
| 2014/0343886 | A1 | 11/2014 | Berinato et al. |
| 2016/0273793 | A1* | 9/2016 | Chromy ................ F24F 11/006 |

FOREIGN PATENT DOCUMENTS

| WO | 2013012475 A2 | 1/2013 |
|---|---|---|
| WO | 2013028941 A1 | 2/2013 |
| WO | 2014011946 A1 | 1/2014 |

* cited by examiner

*Primary Examiner* — Whitney T Moore
(74) *Attorney, Agent, or Firm* — Seagre Tufte & Wickhem LLP

(57) ABSTRACT

A flexible link system and approach for dynamically switching among wall modules of various types without re-engineering an associated controller application. Some of the types of wall modules may incorporate those of Sylk, BACnet and conventional types. A wall module type switching mechanism may incorporate a controller incorporating an application having a flexible link for the connection of wall modules of various types. The flexible link may enable a number of data points of the application to be applicable to various types of wall modules in that switching from a wall module of one type to a wall module of another type does not necessarily require another set of data points in the application.

20 Claims, 11 Drawing Sheets

FIG. 2

Application datapoint Details 24

| ID | Type | Name | Flexlink |
|---|---|---|---|
| P1 | AI | AI_TempSensor | null |
| P2 | AI | AI_HumidSensor | null |
| P3 | AI | AI_CO2Sensor | null |
| P4 | AO | AO_OccStatus | null |
| P5 | AO | AO_BypTime | null |

FIG. 3

BACnet wall module point sharing Details 25

| ID | Name | Direction | Dst Device Id | Dst Point |
|---|---|---|---|---|
| B1 | Temp Sensor | Read | 129 | D1 |
| B2 | Hum Sensor | Read | 129 | D2 |
| B3 | CO2 Sensor | Read | 129 | D3 |
| B4 | Occ Status | Write | 129 | D4 |
| B5 | Byp Time | Write | 129 | D5 |

FIG. 4

Sylk Wall module terminal object Details 26

| ID | Name | Direction | Local PVID | Sylk Obj ID |
|---|---|---|---|---|
| S4 | Temp Sensor | Read | 1104 | 113 |
| S5 | Hum Sensor | Read | 1105 | 113 |
| S6 | CO2 Sensor | Read | 1106 | 113 |
| S7 | Occ Status | Write | 2101 | 113 |
| S8 | Byp Time | Write | 2102 | 113 |

FIG. 5

IO Terminal Object ID

| ID | Type | Name |
|----|------|-------|
| T1 | AI | A1:T1 |
| T2 | AI | A1:T2 |
| T3 | AI | A1:T3 |
| T4 | AO | AO:T4 |
| T5 | AO | AO:T5 |

| ID | ... | Conventional wall module IO Terminal Object Ids |
|----|-----|---|
| T1 | | |
| T2 | | |
| T3 | | |
| T4 | | |
| T5 | | |

31

| ID | ... | BACnet wall module Point sharing Ids |
|----|-----|---|
| B1 | | |
| B2 | | |
| B3 | | |
| B4 | | |
| B5 | | |

32

| ID | ... | Sylk wall module Point binding Ids |
|----|-----|---|
| S1 | | |
| S2 | | |
| S3 | | |
| S4 | | |
| S5 | | |

33

Application datapoint Details 24

| ID | Type | Name | Flexlink |
|----|------|------|----------|
| P1 | AI | AI_TempSensor | null |
| P2 | AI | AI_HumidSensor | null |
| P3 | AI | AI_CO2Sensor | null |
| P4 | AO | AO_OccStatus | null |
| P5 | AO | AO_BypTime | null |

US 10,069,645 B2

FLEXIBLE LINK SYSTEM FOR DYNAMIC SWITCHING AMONG DIFFERENT WALL MODULE TYPES WITH A CONTROLLER

BACKGROUND

The present disclosure pertains to wall modules and particularly to controller interfaces to various wall modules.

SUMMARY

The disclosure may reveal a flexible link system and approach for dynamically switching among wall modules of various types without re-engineering an associated controller application. Some of the types of wall modules may incorporate those of Sylk, BACnet and conventional types. A wall module type switching mechanism may incorporate a controller incorporating an application having a flexible link for the connection of wall modules of various types. The flexible link may enable a number of data points of the application to be applicable to various types of wall modules in that switching from a wall module of one type to a wall module of another type does not necessarily require another set of data points in the application.

BRIEF DESCRIPTION OF THE DRAWING

FIG. 2 is a diagram of a table that reveals application data point details;

FIG. 3 is a diagram of a table that reveals BACnet wall module point sharing details;

FIG. 4 is a diagram of a table that reveals Sylk wall module terminal object details;

FIG. 5 is a diagram of a table that reveals conventional wall module IO terminal object ID's;

FIG. 6 is a diagram of tables indicating their content when no flexible link is established;

DESCRIPTION

Figure 1:
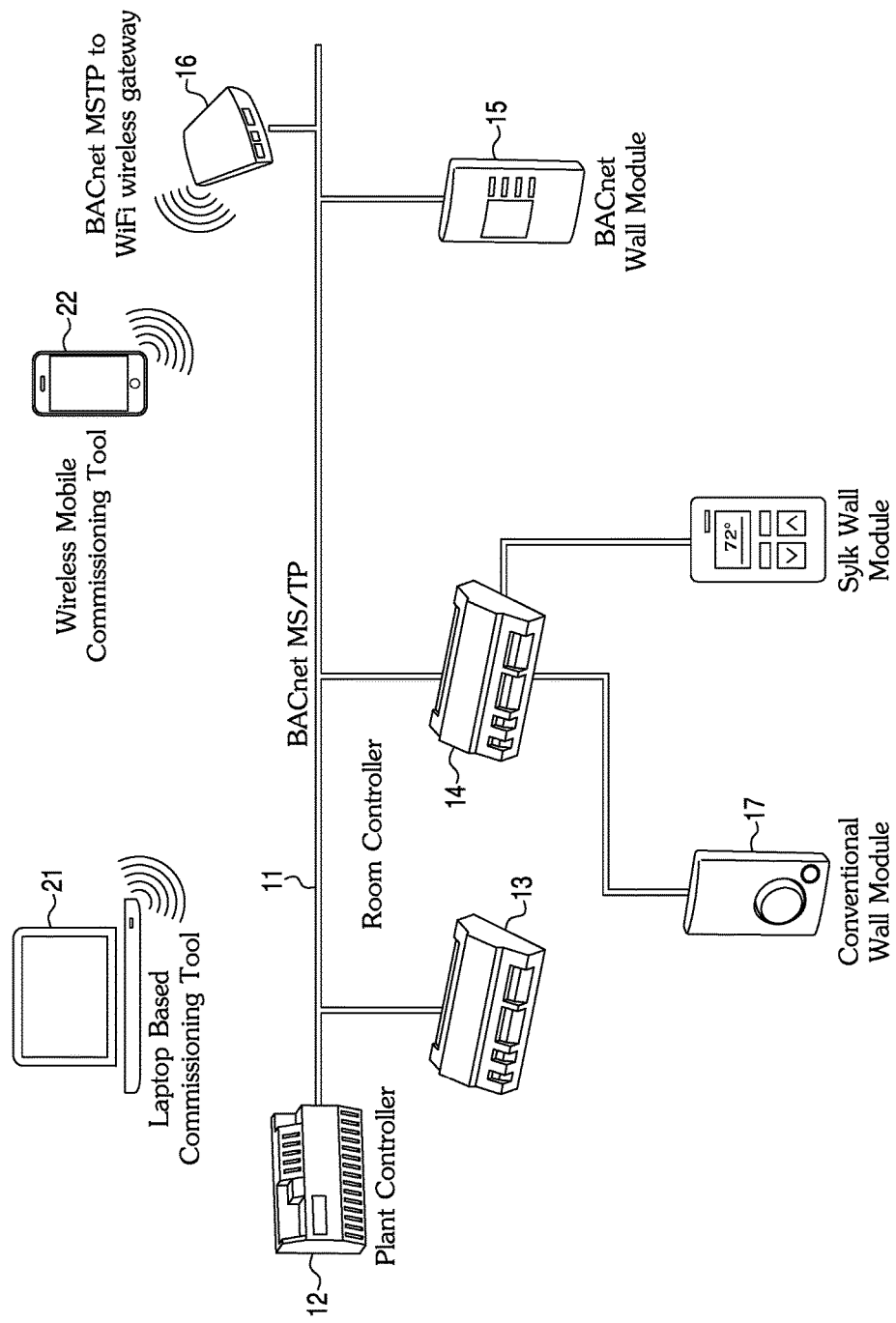
FIG. 1 is a diagram showing connections to different types of wall modules.

The present system and approach may incorporate one or more processors, computers, controllers, user interfaces, wireless and/or wire connections, and/or the like, in an implementation described and/or shown herein.

The present description may provide one or more illustrative and specific examples or ways of implementing the present system and approach. There may be numerous other examples or ways of implementing the system and approach.

Integrated room manager controllers may support different types of wall modules through different channels and protocols such as a Sylk™ bus protocol, BACnet™ protocol or through conventional, input/output (IO) terminals. Conventional controllers may support wall modules through IO terminals. A few controllers may support wall modules through different protocol buses, but these controllers could demand explicit programming changes to switch between one type to another type of wall modules and corresponding protocols. For example, if an application has been designed to use a "conventional" wall module, the same application cannot handle a "Sylk" wall module without making any changes to the next type of wall module, i.e., reprogramming the controller through programming tools.

In case of a configurable controller where an application is not allowed to change, it appears difficult to predict which wall module is required in the field, so the application may have to deal with all variants of all types through switching.

For example, wall modules may support temperature, humidity and $CO_2$ sensors. FCU or AHU applications may need these data values to perform their tasks. If the wall module is IO terminal based, separate wires may be connected from a wall module to the controller. The IO terminals may be mapped to respective IO data points in the controller, based on IO characteristics (IO curve) of the sensors. The resistance values of the sensors may be converted to digital values. Similarly, if the wall module is connected through the Sylk bus or BACnet bus protocol (such protocols may have two wire bus connections), the respective data points may need to be bound to Sylk bus PVID's (parameter value identifiers), or BACnet data points of the wall modules. The values from the wall modules may be communicated through the respective protocols to the controller. To deal with three types of wall modules of the three types of sensor values from each of the wall modules, a total room controller may require nine different data points at an application level. Application programmers may have to explicitly handle the nine different data points to switch between the different wall module types. This way of handling may consume extra runtime memory and execution time in the controller. Also, it may lead to much programming and commissioning effort, and confusion to field technicians. Commissioning engineers may have to remember what type of wall module is connected and test only those specific wall module points and ignore the remaining points.

Similarly for driving any point value into the wall module, the system may need to handle the value explicitly if wall module types are different. The complexity may increase when an application has to deal with different models of conventional wall modules, Sylk wall modules and BACnet wall modules together.

As to another issue, sometimes customers may be asked to change the type of wall modules after an installation is completed. For example, in office types of buildings or visitors' rooms, customers may need an LCD display based digital Sylk wall module instead of a conventional wall module. In this scenario, a field technician may have to replace the wall module, and change the application configuration of the controller through programming tools, re-download into the controller, and perform commissioning of the controller for the newly replaced wall module. This task may take a considerable amount of effort by the technician and cost by the customer.

The present system and approach involving, for example, three types of sensor values, may result in the same total of three different data points at the application level. Yet the application configuration of the controller need not be changed.

The present system and approach may be a solution that enables dynamic switching wall modules from one type to another type without re-programming the controller, reduces the overall number of application data points needed in the controller (for the above example only 3 are needed), and does not necessarily waste controller processor power as there should not be any "if-then-else" conditions in the control application for handling multiple wall modules.

In the present system and approach, a (i.e., flexible link) concept may enable an application programmer to use just one set of data points and to enable switching of the different types of wall modules with a simple configuration change in absence of re-programming the controller.

In the present system and approach, there may be just one set of BACnet data points for the application in the room controller for all of the wall module input and output points. Each of these points may be mapped to wall module points through a flexible link establishment. The flexible link may be established based on a type of wall module that is currently active. When a field technician changes from one wall module type to another wall module type, the flexible link may be changed to another wall module type so that the data point value will flow from the selected wall module shared points to an application data point.

In case of a conventional wall module, each controller IO terminal may have a terminal object that stores information from a physical sensor in a raw data form and also drives output points based on a value set in the terminal object. When the conventional wall module is installed and selected in the application, the linkage from the BACnet data points may be established to the terminal objects of IO terminals. An IO handler of the controller may receive the wall module's sensor values and copy them to terminal objects. The terminal object values may be in turn transferred to respective mapped data points based on flexible link information.

In case of a Sylk wall module, each point which is exposed in the Sylk wall module (i.e., it is called a remote PVID) may have a respective local PVID (parameter value identifier) in the room controller. The Sylk wall module and room controllers may periodically sync the PVID values based on a change of value and periodicity. When a user changes a conventional wall module type to a Sylk wall module type, the application data point flexible link may be switched from a terminal object reference to a local PVID. Now onwards, a controller may transfer data from local PVID's to these same data points. The Sylk wall module handler of the controller may sync data from remote PVID's to local PVID's.

Similarly, in case of a BACnet wall module, for every wall module point there may be an equivalent BACnet shared point in the controller. The BACnet points may exchange data based on a change of values through BACnet communication. When a user changes a conventional wall module type or Sylk wall module type to a BACnet wall module, the data point flexible link may be switched from a terminal object reference or local PVID, respectfully, to a BACnet shared point in the room controller. Now onwards, the controller may transfer data from shared BACnet points to application data points.

In this way, when a user changes from one wall module type to another module type, just flexible link references may be or are changed from one type of objects to another type of objects based on the wall module types. Controller firmware may exchange the data based on current flexible link references, and application data points may remain the same and an application programmer may need not have to deal with multiple data points for different wall module types. The flexible link establishment may be changed dynamically through commissioning tools without reprogramming the control application, and without downloading new application binaries into the controller. This may reduce an overall complexity of the application programming in the controller. A commissioning engineer may easily conduct a point checkout test of just application data points without worrying about how flexible links are established.

FIG. 1 is a diagram showing connections to different types of wall modules. A BACnet MS/TP bus 11 may be connected to by a plant controller 12, a room controller 13, a room controller 14, a BACnet wall module 15 and a BACnet MS/TP to a WiFi wireless gateway 16. A conventional wall module 17 and a Sylk wall module 18 may be connected to room controller 14. A laptop based commissioning tool 21 and a mobile commissioning tool 22 may have a wireless connection to wireless gateway 16.

FIGS. 2-5 have diagrams of various object tables 24, 25, 26 and 27, respectively. Tables 24, 25, 26 and 27 are illustrative examples. In the tables, Pn, Dn, Sn, Bn and Tn may be used as simple representations of ID's (identifications or identifiers). The ID's may follow a BACnet object ID format and be unique in a controller.

Table 24 of FIG. 2 reveals application data point details. The ID's may be P1, P2, P3, P4 and P5 that are of types AI (analog input), and AO (analog output), respectively. The names corresponding to the data points, in the same order of their ID's may be AI_TempSensor, AI_HumidSensor, AI_CO2Sensor, AO_OccStatus and AO_BypTime. Initially, flexible link notation for each of the five ID's may be "null".

FIG. 3 is a diagram that shows table 25 that reveals BACnet wall module point sharing details. The ID may be B1, B2, B3, B4 and B5 that have names Temp Sensor, Hum Sensor, CO2 Sensor, Occ Status and Byp Time, respectively. The directions of the signals for the ID's, in the same order, may be read, read, read, write and write. The destination device ID (Id) for all of the ID's of table 25 may be 129. The destination point ID's may be D1, D2, D3, D4 and D5 for ID's B1, B2, B3, B4 and B5, respectively.

FIG. 4 shows table 26 that reveals Sylk wall module terminal object details. The ID's may be S4, S5, S6, S7 and S8 that have names Temp Sensor, Hum Sensor, CO2 Sensor, Occ Status and Byp Time, respectively. The directions of the signals for the ID's, in the same order, may be read, read, read, write and write. The local PVID's for the ID's, respectively, may be 1104, 1105, 1106, 2101 and 2102. The Sylk Obj ID may be 113 for all of the ID's.

FIG. 5 shows table 27 that reveals conventional wall module IO terminal object ID's T1, T2, T3, T4 and T5. The types of the ID's may be AI, AI, AI, AO and AO, respectively. In the same order, the names corresponding to the ID's may be AI:T1, AI:T2, AI:T3, AO:T4 and AO:T5.

FIG. 6 is a diagram of tables indicating their content when no flexible link is established. Table 24 of FIG. 2 that reveals application data point details may be noted relative to a diagram of FIG. 6 showing tables 31-33. Table 31 is of the conventional wall module IO terminal object ID's T1, T2, T3, T4 and T5 with no additional columns of information corresponding to the ID's. Table 32 is of the BACnet wall module point sharing ID's B1, B2, B3, B4 and B5 with no additional columns of information corresponding to the ID's. Table 33 is of the Sylk wall module point binding ID's S1, S2, S3, S4 and S5 with no additional columns of information corresponding to the ID's FIG. 7 is a diagram of table 24 that shows application data point details with flexible link connections T1, T2, T3, T4 and T5 of table 24 to ID's T1, T2, T3, T4 and T5 of table 31 for the conventional wall module IO terminal object ID's.

Figure 8:
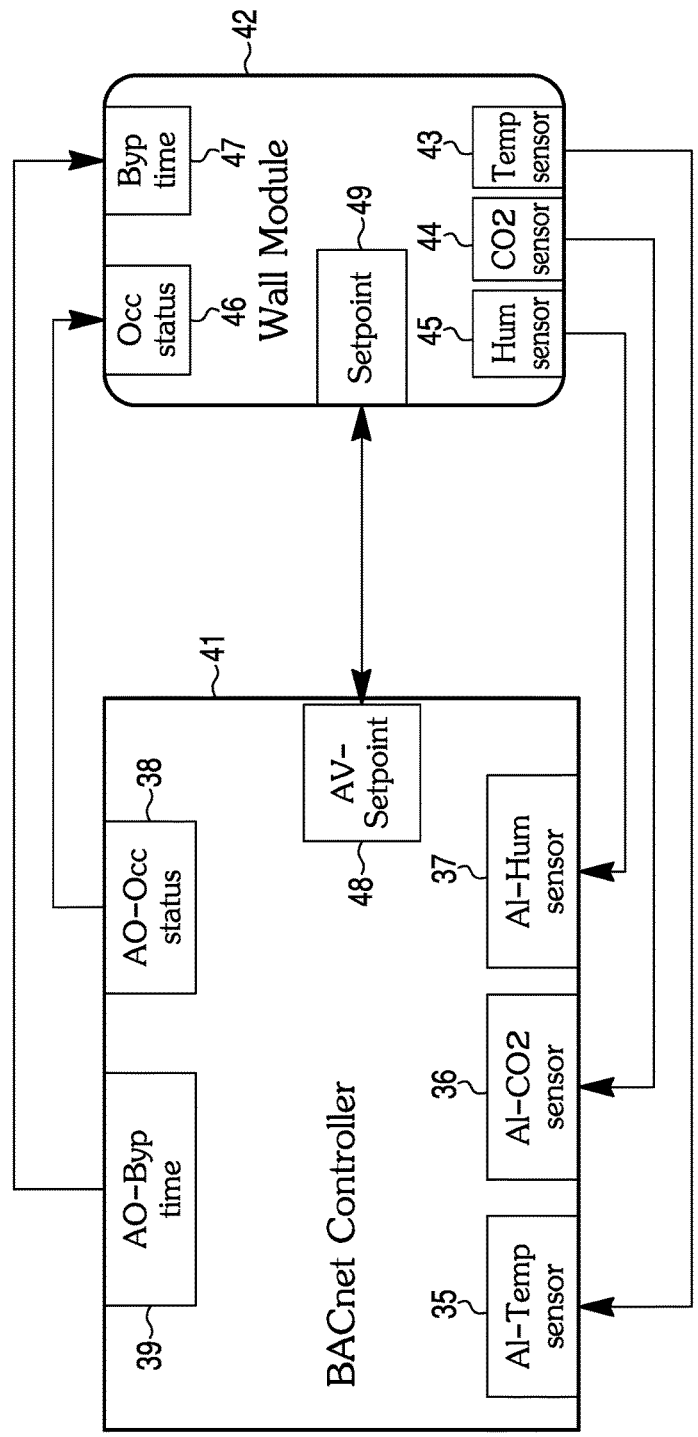
FIG. 8 is a diagram of Sylk wall module point binding.

FIG. 8 is a diagram of Sylk wall module point binding. AI points temperature sensor 35, CO2 sensor 36 and humidity sensor 38 of BACnet controller 41 may be mapped to corresponding PVID's 43, 44 and 45 in a Sylk wall module 42. Wall module 42 may send temperature, CO2 and humidity data to controller 41 at periodic intervals. AO points occupancy status 38 and bypass time 39 of controller 41 may be mapped to corresponding PVID's 46 and 47, respectively, in Sylk wall module 42. Controller 41 may send occupancy status and bypass time data to wall module 42 at periodic intervals. An AV-setpoint 48 of controller 41 may be connected to a setpoint 49 of wall module 42.

Figure 7:
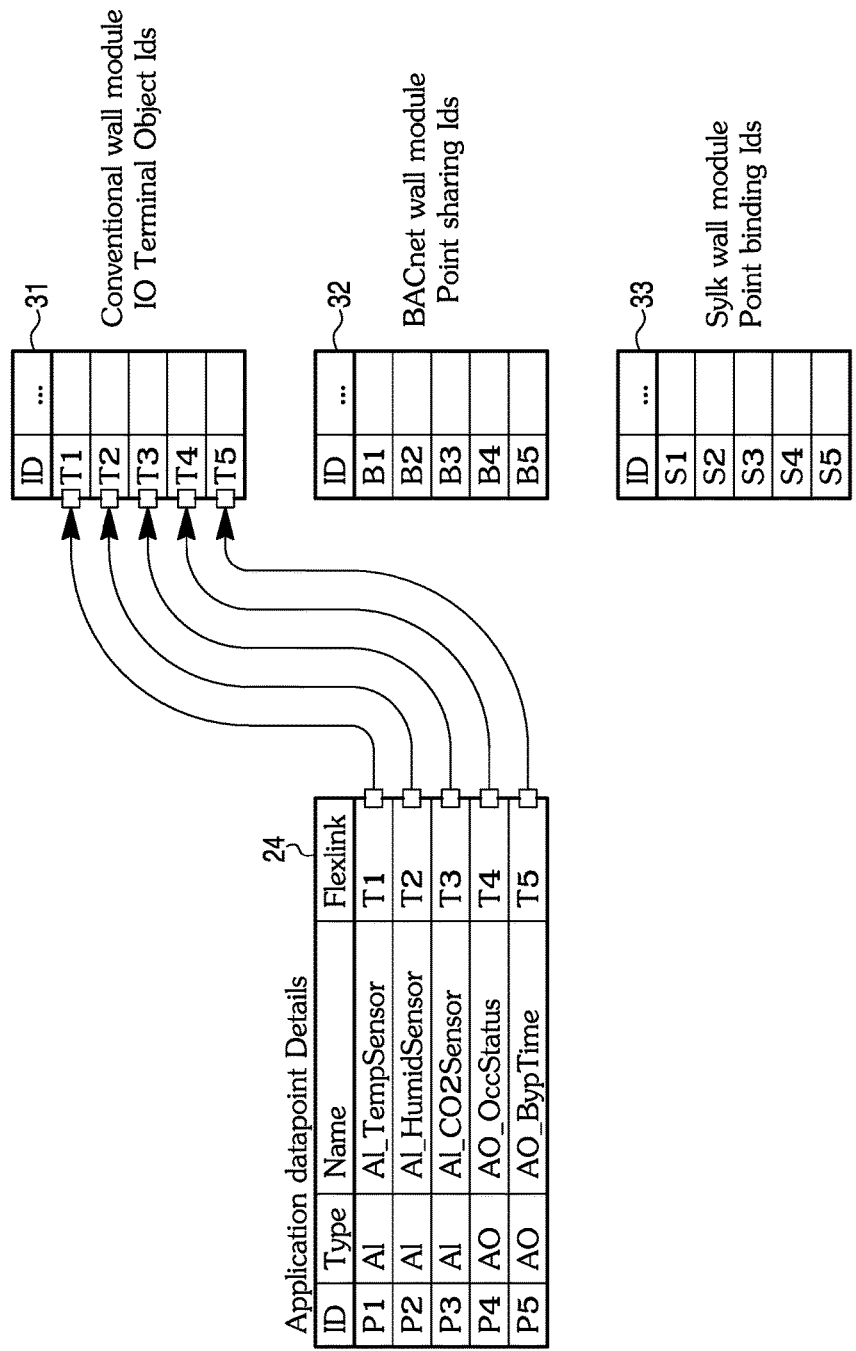
FIG. 7 is a diagram of a table that shows application data point details with flexible link connections for conventional wall module IO terminal object ID's.
Figure 9:
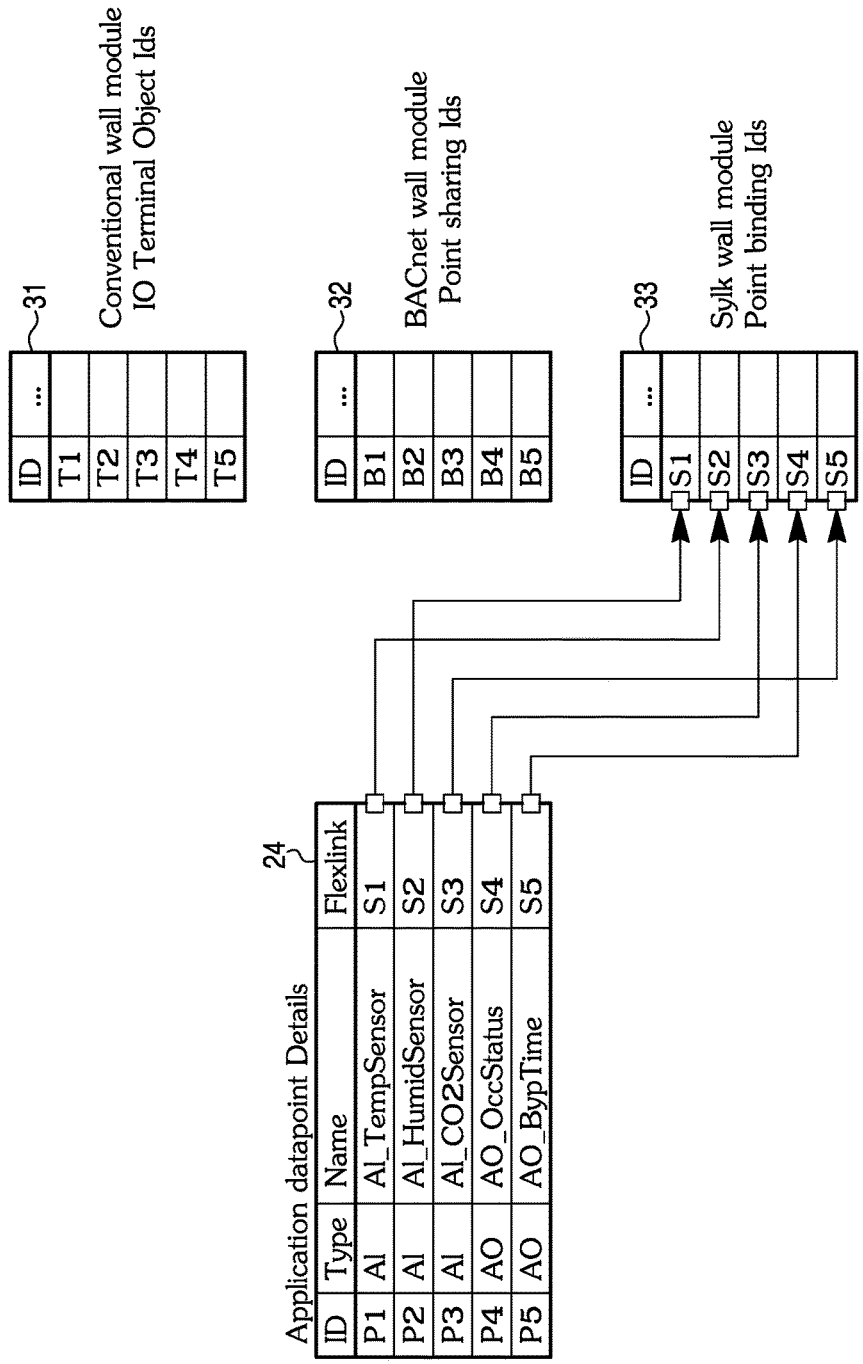
FIG. 9 is a diagram that shows application data point details with flexible link connections for Sylk wall module point binding ID's.

FIG. 9 is a diagram like the diagram of FIG. 7, that shows application data point details with flexible link connections S1, S2, S3, S4 and S5 of table 24 to ID's S2, S1, S5, S3 and S4, respectively, of table 33 for the Sylk wall module point binding ID's.

Figure 10:
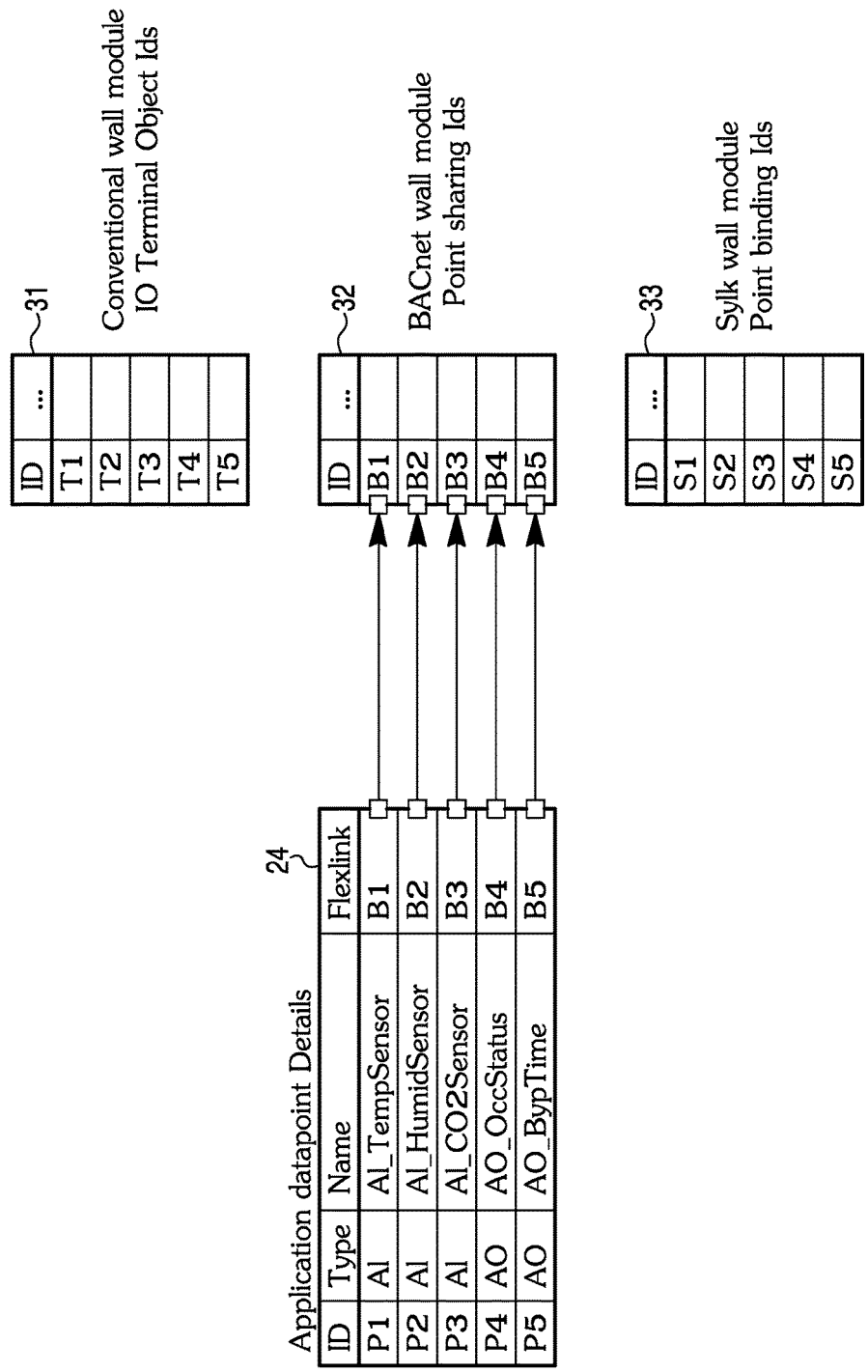
FIG. 10 is a diagram that shows application data point details with flexible link connections for BACnet wall module point sharing ID's.

FIG. 10 is a diagram like the diagram of FIG. 7, that shows application data point details with flexible link connections B1, B2, B3, B4 and B5 of table 24 to ID's B1, B2, B3, B4 and B5 of table 32 for the BACnet wall module point sharing ID's.

Figure 11:
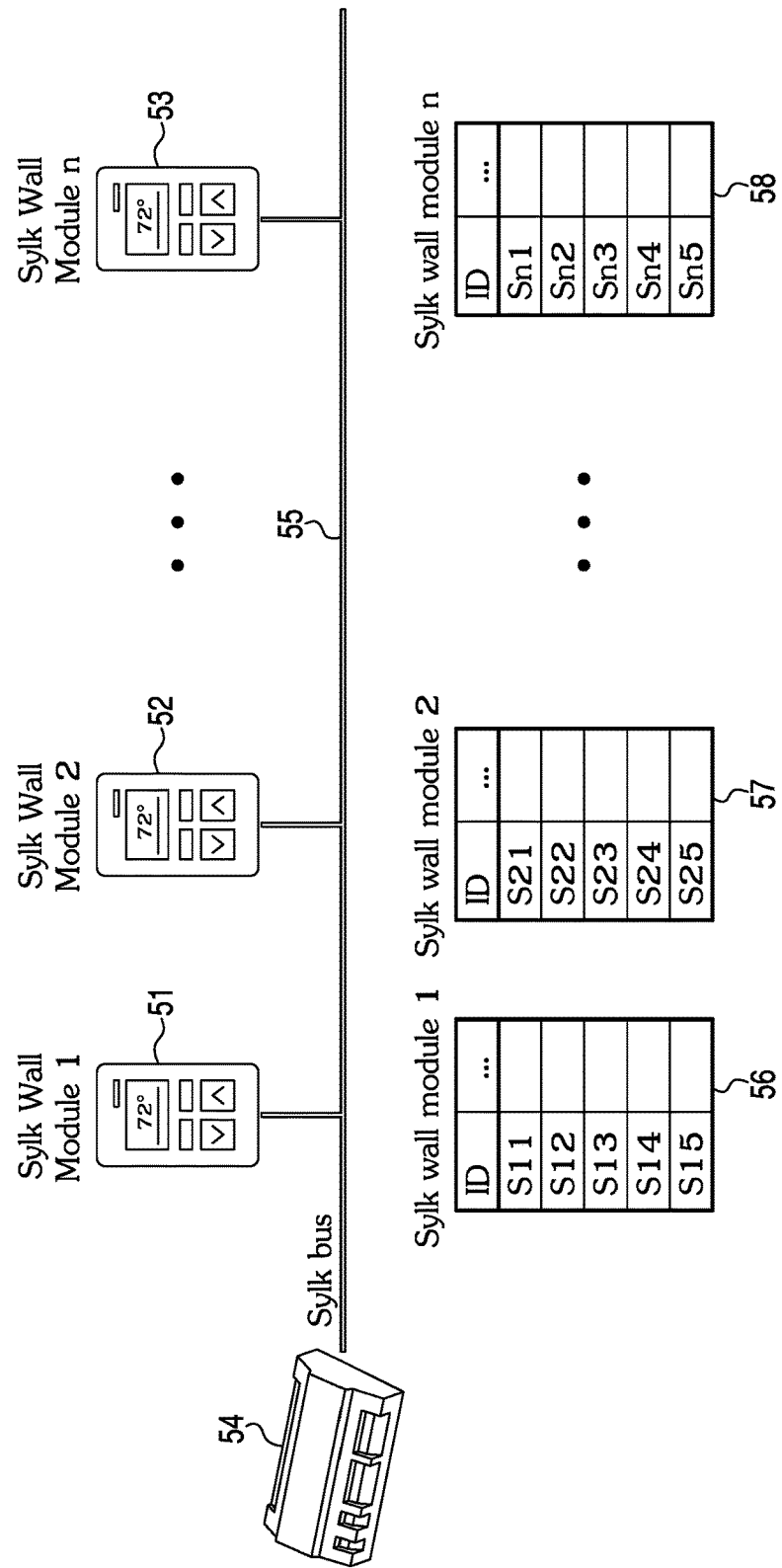
FIG. 11 is a diagram showing aspects of multiple variants of the Sylk wall module connected to a controller via a Sylk bus.

FIG. 11 is a diagram showing aspects of multiple variants of the Sylk wall module connected to a controller 54 via a Sylk bus 55. A Sylk wall module (1) 51, Sylk wall module (2) 52 and Sylk module (n) 53 may be connected to bus 55. There may an n number of Sylk wall modules of different variants, connected to bus 55. The variant wall modules 51, 52 and 53 may be distinguished from one another by their ID tables 56, 57 and 58, for connections, respectively. Table 56 may have ID's S11, S12, S13, S14 and S15. Table 57 may have ID's S21, S22, S23, S24 and S25. Table 58 may have ID's Sn1, Sn2, Sn3, Sn4 and Sn5.

Figure 12:
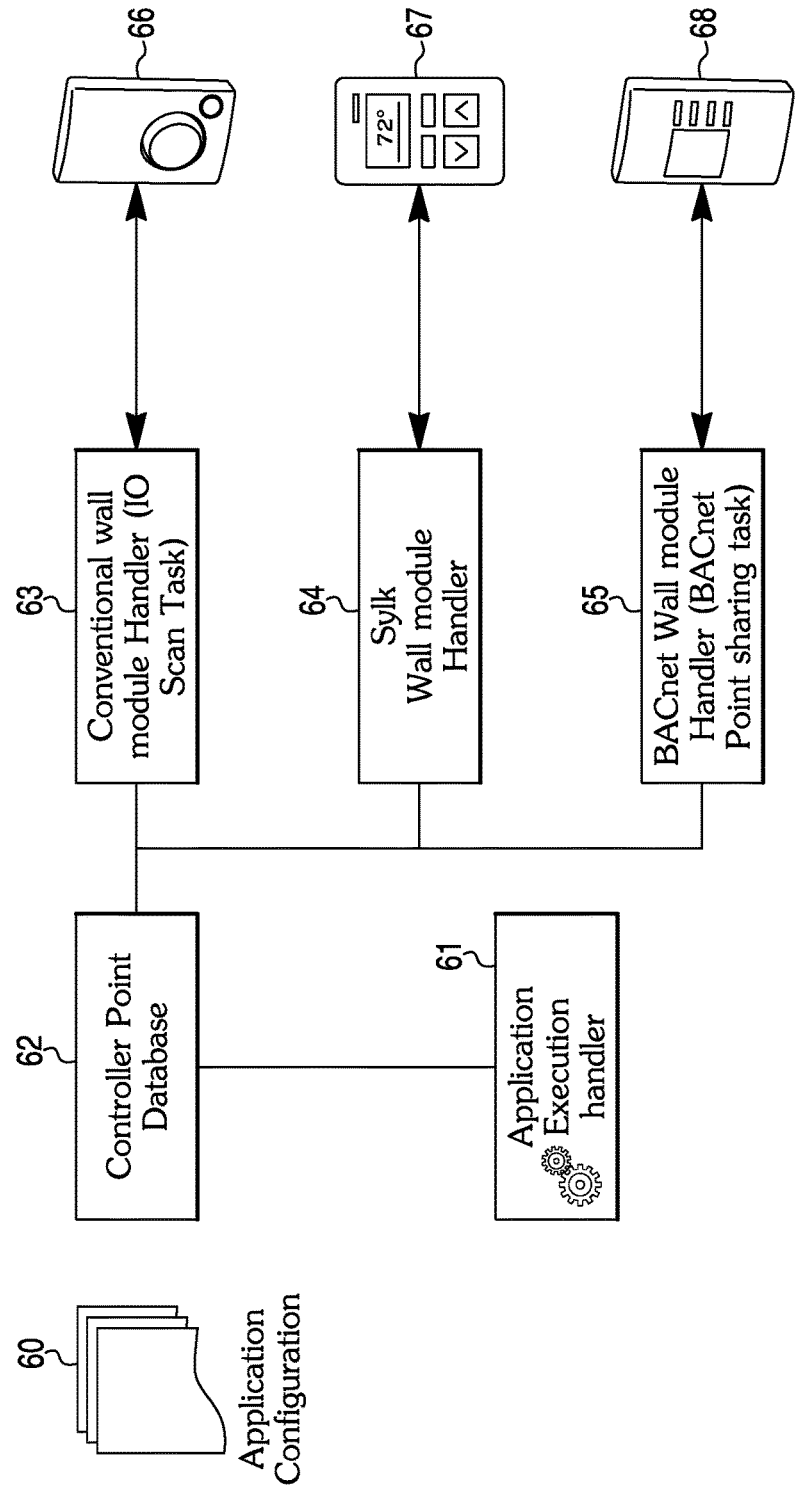
FIG. 12 is a diagram of controller execution for wall modules.

FIG. 12 is a diagram of controller execution for wall modules. An application configuration 60 may be executed relative to various modules. An application execution handler 61 may be connected to a controller point database 62. Controller point database 62 may be connected to a conventional wall module handler (IO scan task) 63, a Sylk wall module handler 64 and a BACnet wall module handler (BACnet point sharing task) 65. A conventional wall module 66 may be connected to wall module handler 63. A Sylk wall module 67 may be connected to wall module handler 64, and a BACnet wall module 68 may be connected to wall module handler 65.

A commissioning tool may trigger switching. A wireless mobile commissioning tool or a desktop based on-line tool may issue a command to a controller to switch from a wall module type to another wall module type based on an actual installation. The wireless mobile commissioning tool may connect to a BACnet room controller through a BACnet MS/TP bus to a WiFi gateway or through an Ethernet to a WiFi router through a plant controller. A laptop based commissioning tool may connect to a room controller in several different ways. One way may be directly through an Ethernet network through a plant controller. Another way may be directly onto a BACnet MS/TP network through an RS485 connection. Still another way may be a wireless connection through a BACnet to a WiFi dongle. Also, it may be a wireless connection through an Ethernet WiFi router via a plant controller.

Figure 13:
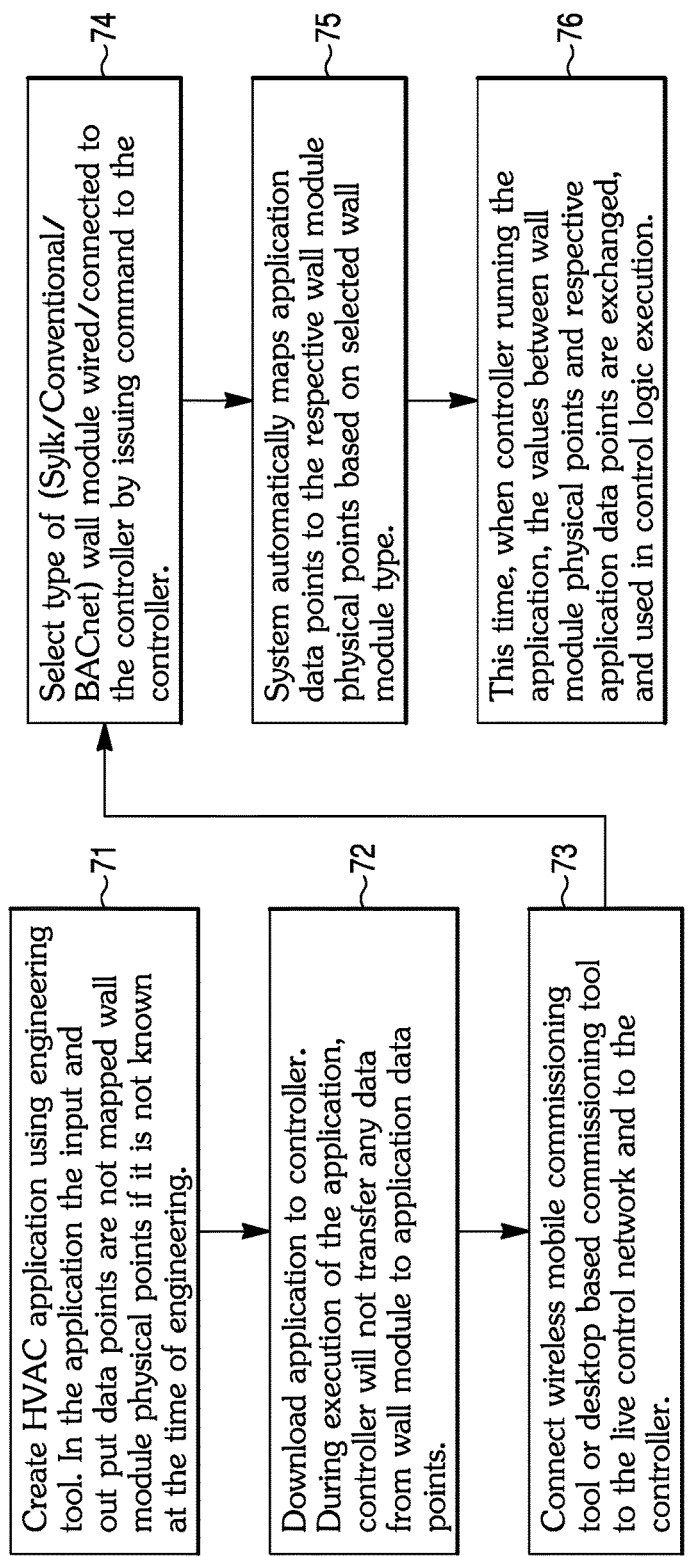
FIG. 13 is a workflow diagram for a wall module change.

FIG. 13 is a workflow diagram for a wall module change. Steps one through six may be labeled as steps 71-76 in the Figure. In step 71, an HVAC application may be created using engineering tool. In the application, the input and output data points are not necessarily mapped wall module physical points if they are not known at the time of engineering. In step 72, the application may be downloaded to a controller. During an execution of the application, the controller will not necessarily transfer any data from a wall module to application data points. In step 73, a wireless mobile commissioning tool or a desktop based commissioning tool may be connected to the live control network and to the controller. In step 74, a type of (Sylk/Conventional/BACnet) wall module wired/connected to the controller may be selected by issuing a command to the controller. In step 75, a system may automatically map application data points to the respective wall module physical points based on a selected wall module type. In step 76, when the controller is running the application, the values between the wall module physical points and respective application data points may be exchanged and used in a control logic execution.

To recap, an approach for a wall module change may incorporate developing an HVAC application with an engineering tool, downloading the application to a controller, connecting a commissioning tool to the controller, connecting a wall module of a first type to the controller, mapping data points of the application to physical points of the wall module of the first type via a flexible link having references for a wall module of the first type, and issuing a command from the commissioning tool to switch from the wall module of the first type to a wall module of a second type by changing the references of the flexible link to references for a wall module of the second type so that there is a mapping the data points of the application to physical points of the wall module of the second type via the flexible link in lieu of the mapping the data points of the application to physical points of the wall module of the first type.

The data points of the application may remain the same when there is a switch from the wall module of the first type to a wall module of a second type.

When the controller is running the application, values between the physical points of the wall module and the data points of the application may be exchanged.

The commissioning tool may be a device selected from a group incorporating a mobile device and a desktop based device.

In the application, input and output data points may be mapped to physical points of the wall module if the data points are known at a time of engineering the application.

During an execution of the application, there may be an absence by the controller to transfer values of physical points from the wall module to data points of the application.

A wall module may be selected from a group incorporating conventional wall modules, Sylk wall modules and BACnet wall modules.

A process of the mapping of data points of the application to the physical points of a wall module may be based on a type of a wall module selected.

The mapping of the application data points may be automatic.

A system with wall module switching may incorporate a commissioning tool being able to establish a connection with the controller, a flexible link incorporated by the controller, and a wall module of a first type connected to the flexible link. The flexible link may enable the controller to switch from a wall module of the first type to a wall module of a second type without reprogramming the controller. The flexible link may enable the application data points during switching from the wall module of the first type to a wall module of the second type, to remain the same.

The system may further incorporate two or more variants of the wall module of the first type. The two or more variants of the wall module of the first type, may be distinguished from one another by their respective point binding identifications (ID's).

The controller may incorporate an application. The application may incorporate a program for the flexible link.

A type of wall module may be selected from a group incorporating conventional, BACnet and Sylk types.

A wall module type switching mechanism may incorporate a controller incorporating an application having a flexible link for connection of a wall module of various types. The flexible link may enable a number of data points of the application to remain the same during switching from a wall module of one type to a wall module of another type.

The controller may have one or more IO (input/output) terminals. Each of the one or more IO terminals may have a terminal object.

A wall module of a first type may be selected by the controller. The flexible link may establish data points to the terminal objects of the IO terminals. An IO handler of the controller may receive sensor values from the wall module of the first type and copy the sensor values to the terminal objects. Values of the terminal objects may be transferred to data points of the application.

A wall module of a second type may be selected by the controller. Each point in the wall module of the second type may be a remote PVID (parameter value identifier). The application may have a data point corresponding to each point in the wall module of the second type. The flexible link may change the data point from a terminal object to a local PVID. Data may be transferred from each local PVID to a data point of the application.

A handler may sync data from remote parameter value (PV) ID's to local PVID's.

Each point in a wall module of a third type may have an equivalent shared point which is a data point in the application as switched by the flexible link.

When a switch is made from a wall module of a first type or a wall module of a second type to the wall module of the third type, the flexible link may switch a data point of the application from a terminal object or a local PVID, respectively, of the wall module of the first type or the wall module of the second type, to a shared point. The controller may then transfer data from shared points of the wall module of the third type to data points of the application.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for a wall module change comprising:
    developing an HVAC application with an engineering tool;
    downloading the application to a controller;
    connecting a commissioning tool to the controller;
    connecting a wall module of a first type to the controller;
    mapping data points of the application to physical points of the wall module of the first type via a flexible link having references for a wall module of the first type; and
    issuing a command from the commissioning tool to switch from the wall module of the first type to a wall module of a second type by changing the references of the flexible link to references for a wall module of the second type so that there is a mapping of the data points of the application to physical points of the wall module of the second type via the flexible link in lieu of mapping the data points of the application to physical points of the wall module of the first type.

2. The method of claim 1, wherein the data points of the application remain the same when there is a switch from the wall module of the first type to a wall module of a second type.

3. The method of claim 1, wherein when the controller is running the application, values between the physical points of the wall module and the data points of the application are exchanged.

4. The method of claim 1, wherein the commissioning tool is a device selected from a group comprising a mobile device and a desktop based device.

5. The method of claim 1, wherein in the application, input and output data points are mapped to physical points of the wall module if the data points are known at a time of engineering the application.

6. The method of claim 1, wherein during an execution of the application, there is an absence by the controller to transfer values of physical points from the wall module to data points of the application.

7. The method of claim 1, wherein a wall module is selected from a group comprising conventional wall modules, Sylk wall modules and BACnet wall modules.

8. The method of claim 1, wherein a process of the mapping of data points of the application to the physical points of a wall module is based on a type of a wall module selected.

9. The method of claim 8, wherein the mapping of the data points of the application is automatic.

10. A system with wall module switching comprising:
    a commissioning tool being able to establish a connection with a controller;
    a flexible link incorporated by the controller; and
    a wall module of a first type connected to the flexible link; and
    wherein:
    the flexible link enables the controller to switch from a wall module of the first type to a wall module of a second type without reprogramming the controller; and
    the flexible link enables application data points during switching from the wall module of the first type to a wall module of the second type, to remain the same.

11. The system of claim 10, further comprising:
    two or more variants of the wall module of the first type; and
    wherein the two or more variants of the wall module of the first type, are distinguished from one another by their respective point binding ID's.

12. The system of claim 10, wherein:
the controller comprises an application; and
the application incorporates a program for the flexible link.

13. The system of claim 10, wherein a type of wall module is selected from a group comprising conventional, BACnet and Sylk types.

14. A wall module type switching mechanism comprising:
a controller incorporating an application having a flexible link for connection of a wall module of various types; and
wherein the flexible link enables a number of data points of the application to remain the same during switching from a wall module of one type to a wall module of another type.

15. The mechanism of claim 14, wherein:
the controller has one or more IO (input/output) terminals; and
each of the one or more IO terminals has a terminal object.

16. The mechanism of claim 15, wherein:
a wall module of a first type is selected by the controller;
the flexible link establishes data points to the terminal objects of the IO terminals;
an IO handler of the controller receives sensor values from the wall module of the first type and copies the sensor values to the terminal objects; and
values of the terminal objects are transferred to data points of the application.

17. The mechanism of claim 15, wherein:
a wall module of a second type is selected by the controller;
each point in the wall module of the second type is a remote PVID (parameter value identifier);
the application has a data point corresponding to each point in the wall module of the second type;
the flexible link changes the data point from a terminal object to a local PVID; and
data are transferred from each local PVID to a data point of the application.

18. The mechanism of claim 17, wherein a handler syncs data from remote PVID's to local PVID's.

19. The mechanism of claim 15, wherein each point in a wall module of a third type has an equivalent shared point which is a data point in the application as switched by the flexible link.

20. The mechanism of claim 18, wherein:
when a switch is made from a wall module of a first type or a wall module of a second type to the wall module of the third type, the flexible link switches a data point of the application from a terminal object or a local PVID, respectively, of the wall module of the first type or the wall module of the second type, to a shared point; and
the controller can then transfer data from shared points of the wall module of the third type to data points of the application.

* * * * *